(12) United States Patent
Bayh

(10) Patent No.: US 7,434,040 B2
(45) Date of Patent: Oct. 7, 2008

(54) COPYING OF UNALIGNED DATA IN A PIPELINED OPERATION

(75) Inventor: Jon F. Bayh, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 386 days.

(21) Appl. No.: 11/188,614

(22) Filed: Jul. 25, 2005

(65) Prior Publication Data
US 2007/0022280 A1 Jan. 25, 2007

(51) Int. Cl.
G06F 9/30 (2006.01)
G06F 9/40 (2006.01)
G06F 15/00 (2006.01)

(52) U.S. Cl. .......................... 712/300; 712/7
(58) Field of Classification Search ............ 712/300
See application file for complete search history.

(56) References Cited

U.S. PATENT DOCUMENTS

| | | | |
|---|---|---|---|
| 4,814,976 A | * | 3/1989 | Hansen et al. ............ 711/201 |
| 5,192,950 A | | 3/1993 | Stephenson, Jr. |
| 5,581,773 A | | 12/1996 | Glover |
| 6,539,467 B1 | | 3/2003 | Anderson et al. |
| 6,574,724 B1 | | 6/2003 | Hoyle et al. |
| 6,721,866 B2 | * | 4/2004 | Roussel et al. ............ 711/201 |
| 6,728,865 B1 | | 4/2004 | Coon et al. |
| 6,813,734 B1 | * | 11/2004 | Bhardwaj ................. 714/48 |
| 6,889,311 B2 | | 5/2005 | Flores et al. |
| 7,219,212 B1 | * | 5/2007 | Sanghavi et al. ............ 712/6 |
| 2002/0108027 A1 | * | 8/2002 | Miyamori ................. 712/223 |

OTHER PUBLICATIONS

Shen et. al, Modern Processor Design: Fundamentals of Superscalar Processors; Jul. 2002; McGraw Hill; beta edition; pp. 37-38.*

* cited by examiner

*Primary Examiner*—Eddie P Chan
*Assistant Examiner*—Corey S Faherty

(57) ABSTRACT

Methods, computer readable media and computing devices including program instructions are provided for copying unaligned data. One method embodiment includes using 12 execution units to move 16 bytes of data from an unaligned data area to an aligned data area during each iteration of a loop in a pipelined operation, such that each iteration can be executed in one machine cycle.

21 Claims, 7 Drawing Sheets

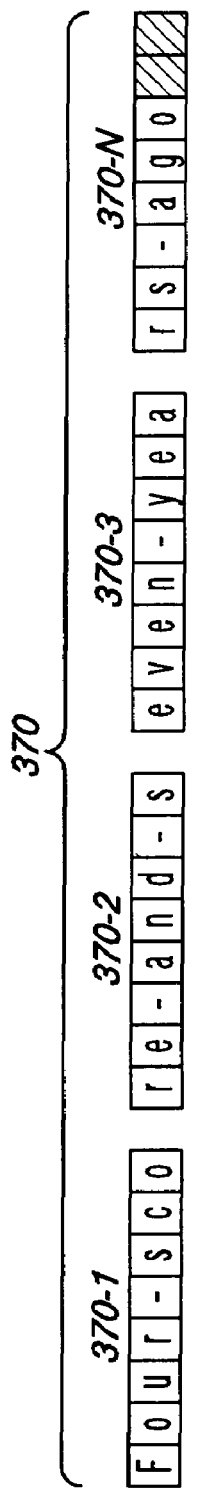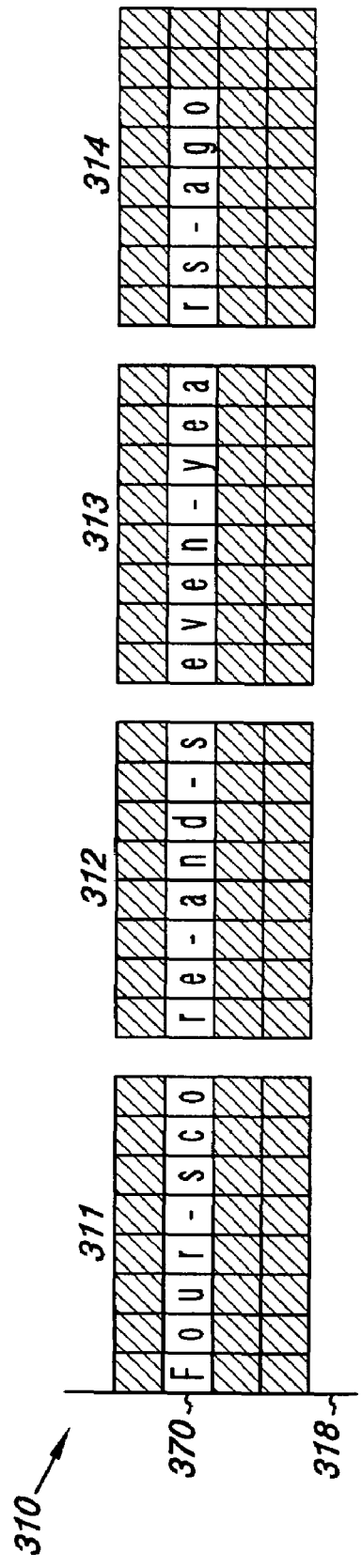
Fig. 3C
Fig. 3D

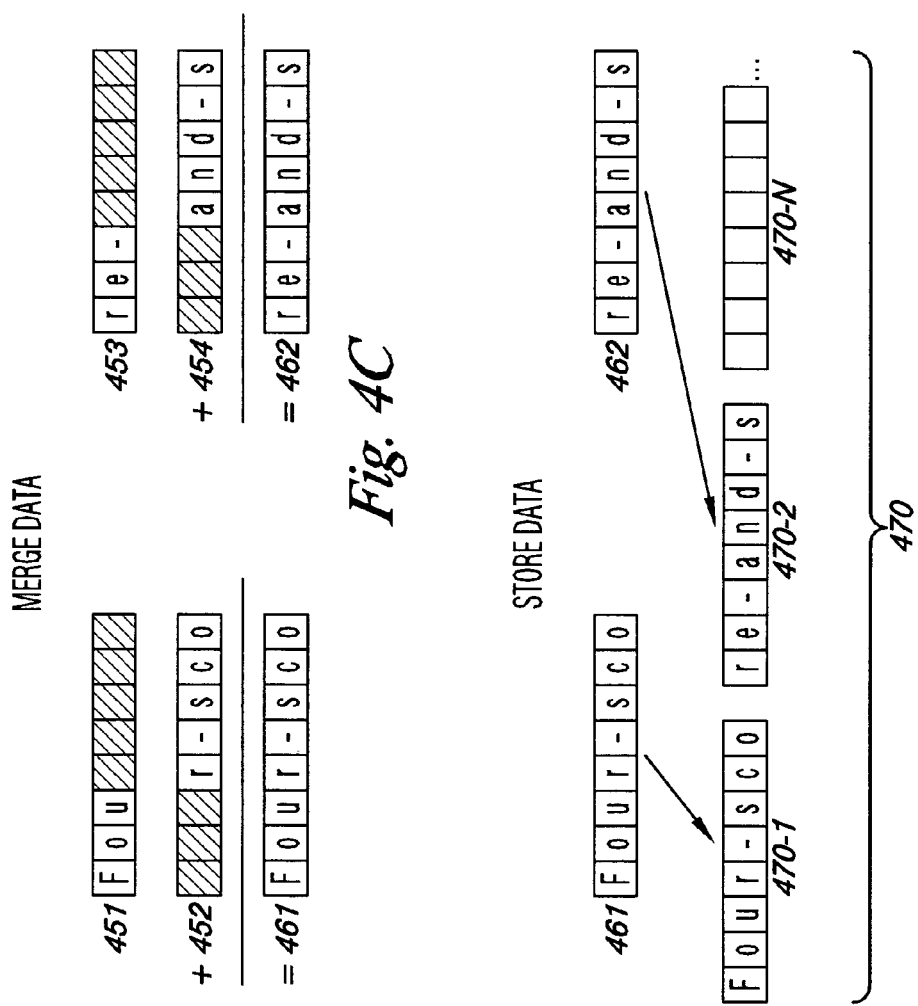

Fig. 5A

| PIPELINED EXECUTION UNITS | PROCESSOR CYCLES | | | | | | | |
|---|---|---|---|---|---|---|---|---|
| | 1 | 2 | 3 | 4 | 5 | 6 | 7 | 8 |
| 1 | LOAD (A) | SHIFT (A) | MERGE (A) | STORE (A) | | | | |
| 2 | | LOAD (B) | SHIFT (B) | MERGE (B) | STORE (B) | | | |
| 3 | | | LOAD (C) | SHIFT (C) | MERGE (C) | STORE (C) | | |
| 4 | | | | LOAD (D) | SHIFT (D) | MERGE (D) | STORE (D) | |

Fig. 5B

| PIPELINED OPERATIONS | PROCESSOR CYCLES | | | | | | | |
|---|---|---|---|---|---|---|---|---|
| | 1 | 2 | 3 | 4 | 5 | 6 | 7 | 8 |
| LOAD | T | T | T | T | F | F | F | F |
| SHIFT | F | T | T | T | T | F | F | F |
| MERGE | F | F | T | T | T | T | F | F |
| STORE | F | F | F | T | T | T | T | F |

# COPYING OF UNALIGNED DATA IN A PIPELINED OPERATION

BACKGROUND

In the field of computing, computing devices store data in memory. A memory consists of an array of data registers at locations referred to by memory addresses. A memory includes one or more natural boundaries that mark the beginnings of data registers. A string of data or a data item that is aligned begins at a natural boundary. A string of data or a data item that is unaligned does not begin at a natural boundary.

A computing device copies data by executing various program instructions to access the data's memory location and copy the data. Some computing devices execute program instructions to access memory by referring to memory addresses at natural boundaries. When these devices copy unaligned data, they can experience difficulties in executing efficient program instructions for copying the data.

BRIEF DESCRIPTION OF THE DRAWINGS

FIG. 3C illustrates aligned data copied according to embodiments of the present disclosure.

FIG. 3D illustrates a memory with aligned data copied according to embodiments of the present disclosure.

FIG. 4C illustrates merging data according to embodiments of the present disclosure.

FIG. 4D illustrates storing data according to embodiments of the present disclosure.

FIG. 5A is a chart illustrating pipelined operations in pipelined execution units according to embodiments of the present disclosure.

FIG. 5B is a chart illustrating states of pipelined operations according to embodiments of the present disclosure.

DETAILED DESCRIPTION

Embodiments include systems, methods, and devices, including executable program instructions, for copying unaligned data. One method embodiment includes loading, shifting, merging, and storing data. According to various embodiments, program instructions execute to load unaligned data from a string of unaligned data to form units of unaligned data, shift portions of the units of unaligned data to form aligned portions of data, merge the aligned portions of data into units of aligned data, and store the units of aligned data to form a string of aligned data.

Executing program instructions to perform operations in parallel is more efficient than executing program instructions to perform operations in sequence. Executing program instructions to access multiple units of data at a time is also more efficient than executing program instructions to access one unit at a time. According to various embodiments, a pipelined computing device can efficiently copy unaligned data by executing pipelined program instructions to load multiple units of data at a time and to perform in parallel, operations to load, shift, merge, and store data.

Figure 1:
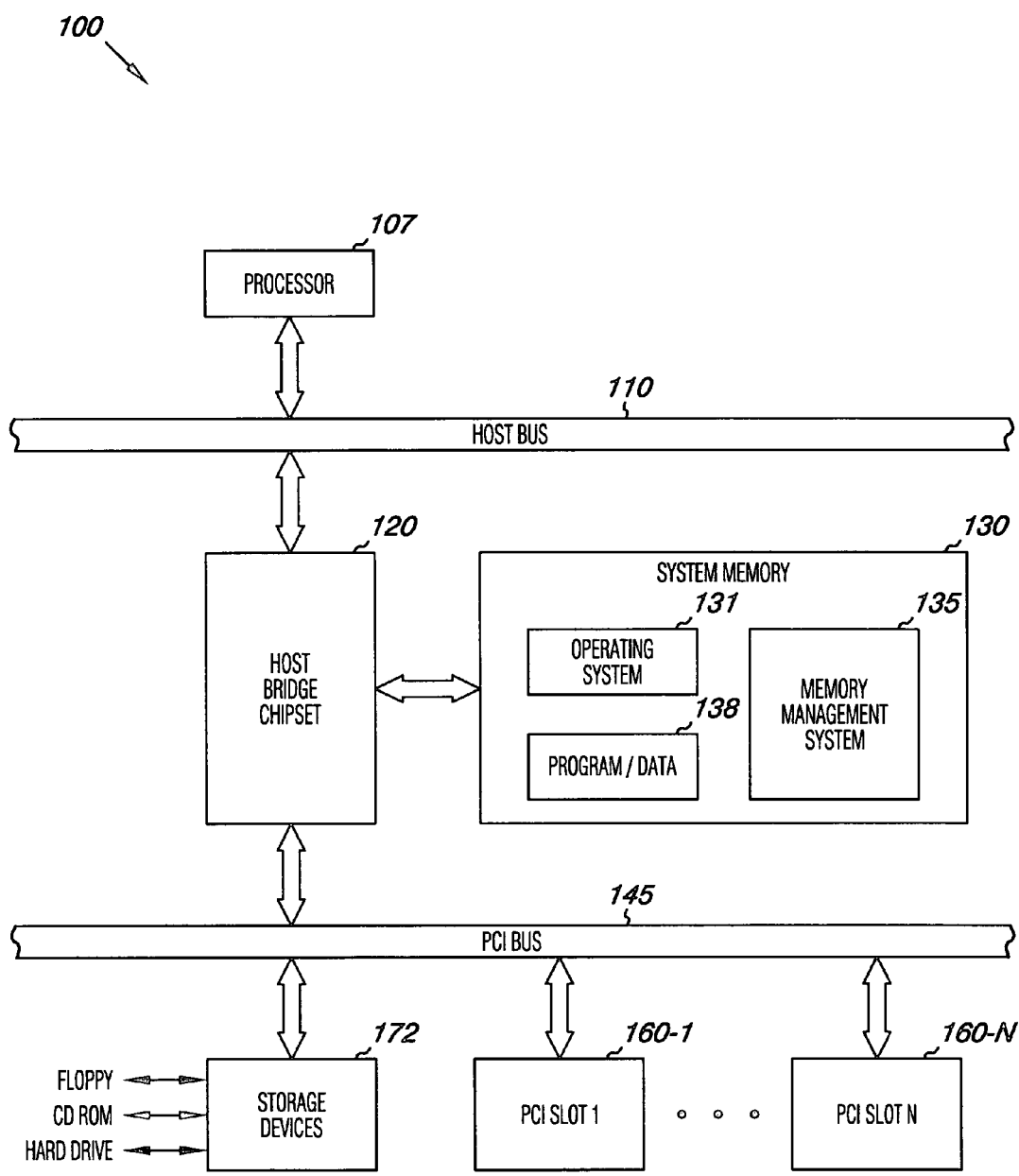
FIG. 1 illustrates an example of a computing device suitable to implement embodiments of the present disclosure.

FIG. 1 illustrates an example of a computing device suitable to implement embodiments of the present disclosure. The system or computing device 100 shown illustrates a processor 107, a host bus 110, a host bridge chipset 120, a system memory 130, a peripheral component interconnect (PCI) bus 145, "N" (representing a scalable number) PCI slots 160-1 to 160-N (e.g., slots for I/O circuit cards, controller cards, and other removable devices), and one or more storage devices (e.g., disks, CDs, hard drives, removable memory, etc.), shown generally as 172.

The processor 107 represents a processing unit of various architectures. Embodiments of the disclosure can be implemented in a multi-processor or single processor system or computing device. Embodiments described herein can similarly be implemented in a distributed computing network environment, as the same are known and understood by one of ordinary skill in the art. The embodiments are not limited to the examples given herein.

The host bridge chipset 120 includes a number of interface circuits to allow the host processor 107 to access the system memory 130 and the PCI bus 145. The system memory 130 represents one or more mechanisms for storing information. For example, the system memory 130 may include non-volatile and/or volatile memories. Examples of these memories include flash memory, read only memory (ROM), random access memory (RAM), etc. The system memory 130 may be loaded with an operating system (OS) 131, e.g., in ROM. A basic input/output system (BIOS) is stored in ROM in the system memory 130. Examples of operating systems include, but are not limited to, Windows, Mac, Unix, Linux, etc. The system memory 130 further includes a memory management system 135, e.g., in RAM, and other programs and data 138. The system memory 130 may also contain additional software as the same will be known and understood by one of ordinary skill in the art. The memory management system 135 includes elements such as virtual memory data structures associated with various processes to support the management of memory in connection with program applications being executed by the processor 107. That is, as one of ordinary skill in the art will appreciate, the memory management system includes programs, code, data, look-up tables, etc.

The PCI slots 160-1 to 160-N provide interfaces to PCI devices. Examples of PCI devices can include printers, removable disk storage and databases, facsimiles, scanners, network interface devices, media interface devices, etc. Storage devices 172 can include CD ROMs, databases, disks, hard drives, etc. Embodiments, however, are not limited to these examples.

A pipelined computing device can execute program instructions to perform operations in parallel. A pipelined computing device can include multiple pipelines leading to a processor with multiple execution units. A processor in a pipelined computing device can simultaneously receive multiple program instructions through pipelines and simultaneously execute multiple program instructions with its execution units.

To simultaneously execute multiple program instructions, a pipelined computing device uses pipelined program instructions. (Pipelined program instructions are written, ordered, and/or organized so instructions can be simultaneously executed.) In some cases, certain pipelined program instructions may sequentially depend upon each other, so that not all pipelined program instructions can be simultaneously executed. (When pipelined program instructions can execute so that operations can be performed in parallel, those operations are also considered pipelined.)

Figure 2:
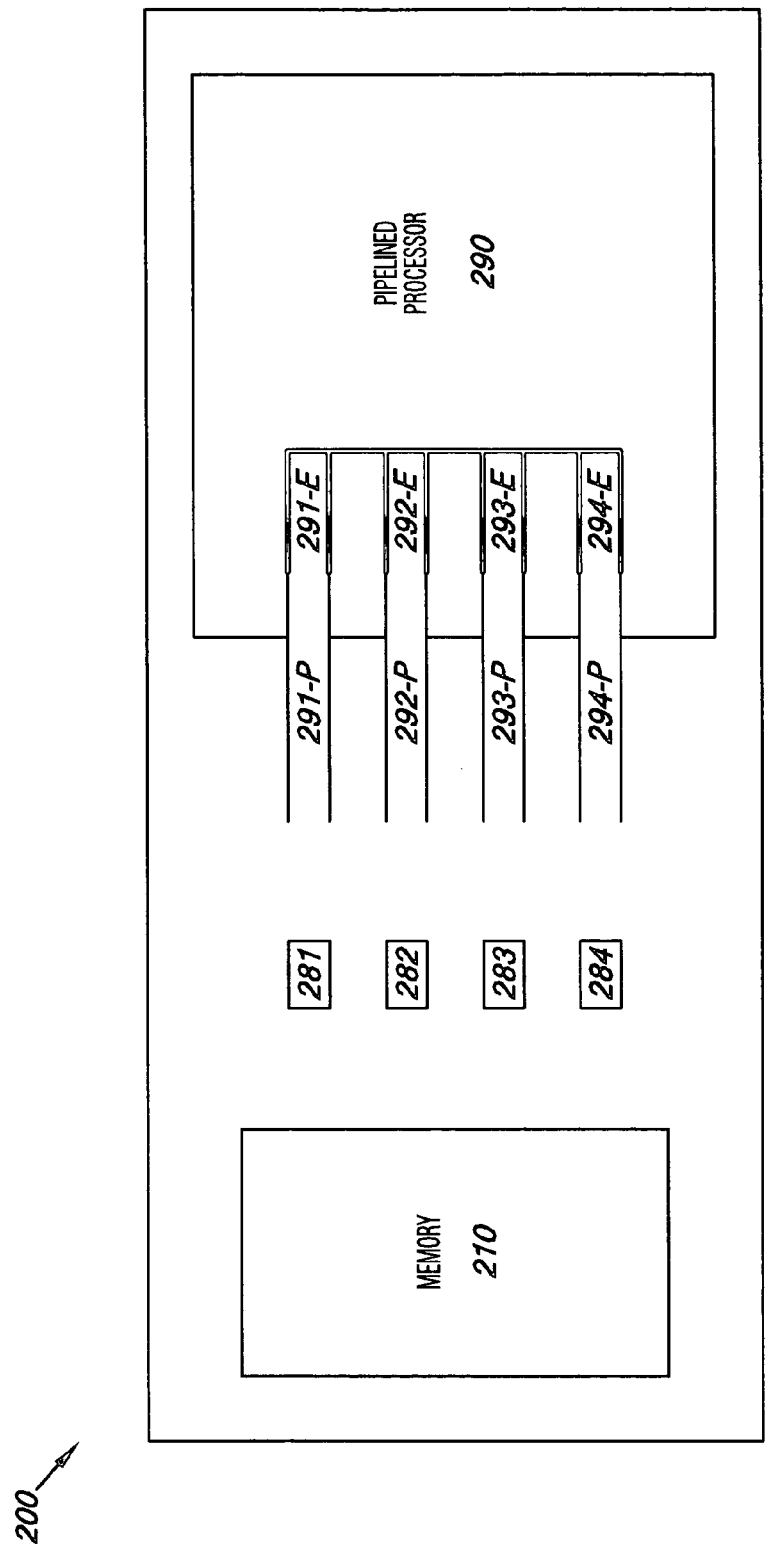
FIG. 2 illustrates an embodiment of a pipelined computing device suitable to implement embodiments of the present disclosure.

FIG. 2 illustrates an embodiment of a pipelined computing device suitable to implement embodiments of the present disclosure. In the embodiment shown in FIG. 2, a computing device has a processor and a memory. FIG. 2 shows a pipelined computing device 200 with a pipelined processor 290 connected to a memory 210. The memory 210 is capable of storing pipelined program instructions and the pipelined processor 290 is capable of executing pipelined program instructions.

In the embodiment shown in FIG. 2, the pipelined computing device 200 includes pipelines 291-P, 292-P, 293-P, and 294-P. The pipelined processor 290 contains execution units 291-E, 292-E, 293-E, and 294-E. In this embodiment, one pipeline is connected to each execution unit. FIG. 2 also shows pipelined program instructions 281, 282, 283, and 284. Pipelines 291-P, 292-P, 293-P, and 294-P can simultaneously transmit pipelined program instructions. Execution units 291-E, 292-E, 293-E, and 294-E can simultaneously execute pipelined program instructions. For example, pipelined program instructions 281, 282, 283, and 284 can be simultaneously transmitted through pipelines 291-P, 292-P, 293-P, and 294-P and simultaneously executed by execution units 291-E, 292-E, 293-E, and 294-E.

Figure 3A:
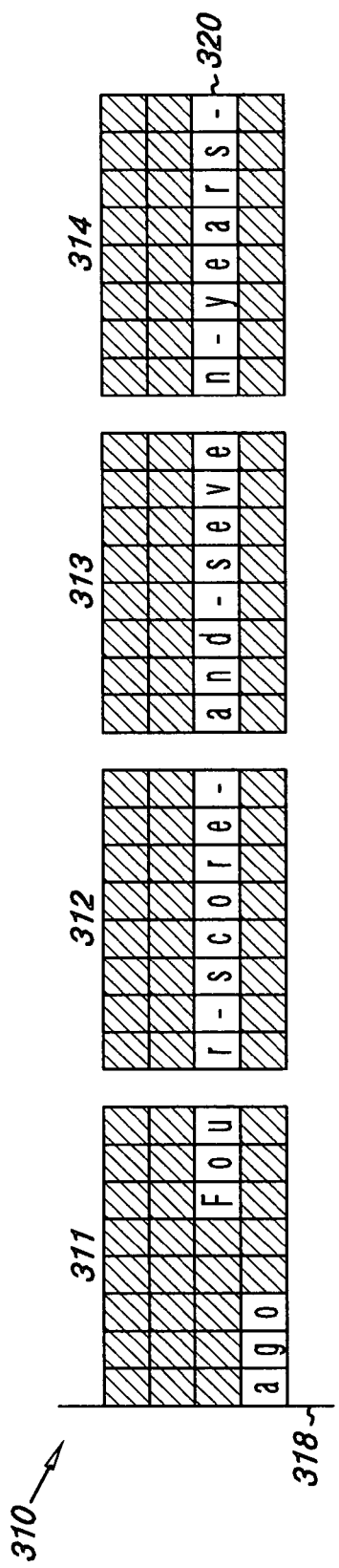
FIG. 3A illustrates a memory with unaligned data to be copied according to embodiments of the present disclosure.

FIGS. 3A-3D illustrate data operated on according to embodiments of the present disclosure. FIG. 3A illustrates a memory with unaligned data to be copied according to embodiments of the present disclosure. FIG. 3A shows a memory 310 with a string of unaligned data 320 to be copied. The memory includes memory banks 311, 312, 313, and 314 with byte sized data registers. The memory 310 also includes a natural boundary 318 at the beginning of the data registers of the memory bank 311. The string of unaligned data 320 begins in the memory bank 311, continues through memory banks 312, 313, and 314 and ends in the memory bank 311. The string of unaligned data 320 is unaligned because it does not begin at the natural boundary 318 or another natural boundary. In this embodiment, hatched areas represent unused memory and text is used to represent the order flow to the string of unaligned data 320. Embodiments are not limited to the type and/or size of memory.

The memory can be big-endian, little-endian, middle-endian or some other type of endianess. The memory can consist of data registers of various sizes, including eight bit data registers, 16 bit data registers, 32 bit data registers, 64 bit data registers, and/or data registers of other sizes. In various embodiments, the memory can have one, two, four, eight or another number of memory banks. The memory can have one or more natural boundaries at one or more ends of one or more data registers and/or memory banks. Further, memory can be addressable by bits, by bytes and/or by some other quantity.

Figure 3B:
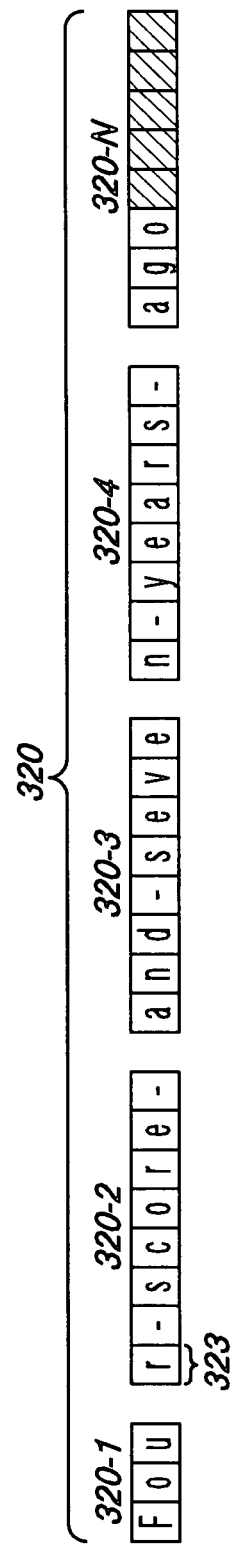
FIG. 3B illustrates unaligned data to be copied according to embodiments of the present disclosure.

FIG. 3B illustrates unaligned data to be copied according to embodiments of the present disclosure. FIG. 3B shows the string of unaligned data 320. The string of unaligned data 320 includes a remainder 320-1, and units of unaligned data 320-2, 320-3, 320-4, and 320-N. The units of data as described herein are not limited to the type and/or size of particular data. For example, according to various embodiments each block, e.g., 323 in FIG. 3B, can be considered as representing an entire byte of data. The discussion which follows will refer to each block in this manner. Thus, in this illustrative embodiment a block 323 within a unit of data, e.g., 320-2, represents a byte and the units of unaligned data 320-2, 320-3, 320-4, and 320-N are each eight bytes long. The string of unaligned data 320 uses parts of five units. In the remainder 320-1, the string of unaligned data 320 occupies three bytes. In units of unaligned data 320-2, 320-3, and 320-4, the string of unaligned data 320 occupies all eight bytes. In unit of unaligned data 320-N, the string of unaligned data 320 occupies three bytes of the eight bytes available. The unit of unaligned data 320-N contains the end of the string of unaligned data 320. The string of unaligned data 320 is to be copied to a memory address at a natural boundary.

The data to be copied can consist of combinations of numbers, letters, characters, images, and/or other symbols. In various embodiments, the data to be copied can be a string of data, a data item and/or another type of data. Data to be copied can have various lengths and/or sizes.

FIG. 3C illustrates aligned data copied according to embodiments of the present disclosure. FIG. 3C shows the string of data from FIG. 3B, copied as a string of aligned data 370. The string of aligned data 370 uses parts of four bytes. In units of aligned data 370-1, 370-2, and 370-3, the string of aligned data 370 occupies all eight bytes of these units. In unit of aligned data 370-N, the string of aligned data 320 occupies six bytes of the eight bytes available. The unit of aligned data 320-N contains the end of the string of aligned data 370.

FIG. 3D illustrates a memory with aligned data copied according to embodiments of the present disclosure. FIG. 3D shows the memory 310 with the memory banks 311, 312, 313, and 314. The memory 310 includes the natural boundary 318 at the beginning of the memory bank 311. The string of aligned data 370 begins in the memory bank 311, continues through memory banks 312 and 313, and ends in the memory bank 314. The string of aligned data 370 is aligned because it begins at the natural boundary 318.

FIGS. 4A-4D illustrate embodiments of a method of the present disclosure. Unless explicitly stated, the method embodiments described herein are not constrained to a particular order or sequence. Additionally, some of the described method embodiments or elements thereof can occur or be performed at the same point in time.

The embodiments described herein can be performed by software and/or firmware (i.e., computer executable instructions), hardware, application modules, and the like, executable and/or resident on the systems and devices shown herein or otherwise. The embodiments of the invention are not limited to any particular operating environment or to instructions written in a particular programming language. Software, firmware, and/or processing modules, suitable for carrying out embodiments of the present invention, can be resident in one or more devices or locations, including a computer readable medium such as a memory device. Processing modules can include separate modules connected together or include several modules on an application specific integrated circuit (ASIC).

Figure 4A:
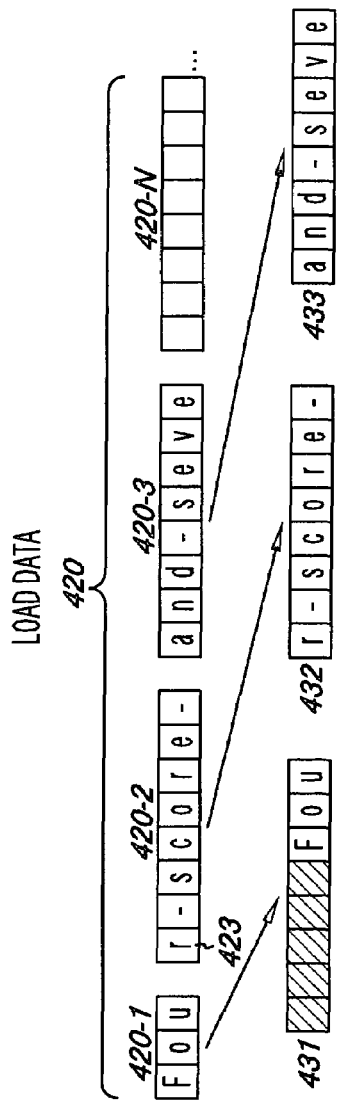
FIG. 4A illustrates loading data according to embodiments of the present disclosure.

FIG. 4A illustrates loading data according to embodiments of the present disclosure. In the embodiment shown in FIG. 4A, program instructions execute to load units, e.g., 8 bytes, of unaligned data from a string of unaligned data, as an operation in a method of copying unaligned data. FIG. 4A shows a string of unaligned data 420 as a remainder 420-1, and units of unaligned data 420-2, 420-3, and 420-N. By way of example and not by way of limitation, a unit of data is 8 bytes with each block, e.g., 423, representing a byte. In the remainder 420-1, the string of unaligned data 420 occupies three bytes. In units of unaligned data 420-2 and 420-3 the string of unaligned data 420 occupies all eight bytes of each unit. Unit of unaligned data 420-N represents the end of the string of unaligned data 420. Again, embodiments can apply to units of data of various sizes, e.g., a unit of data can be a nibble, a byte, a word, a double-word, or some other unit of data.

In the embodiment shown in FIG. 4A, program instructions execute to load unaligned data from the string of unaligned data 420 into 8-byte sized data registers. Program instructions execute to load the remainder 420-1 into a first temporary data register 431, which is 8-bytes in length. The data from remainder 420-1 occupies three bytes at an end of the first data register 431. Program instructions execute to load the unit of unaligned data 420-2 into a second temporary data register 432, which is 8-bytes in length. Program instructions execute to load the unit of unaligned data 420-N into a third temporary data register 433, which is also 8-bytes in length.

Figure 4B:
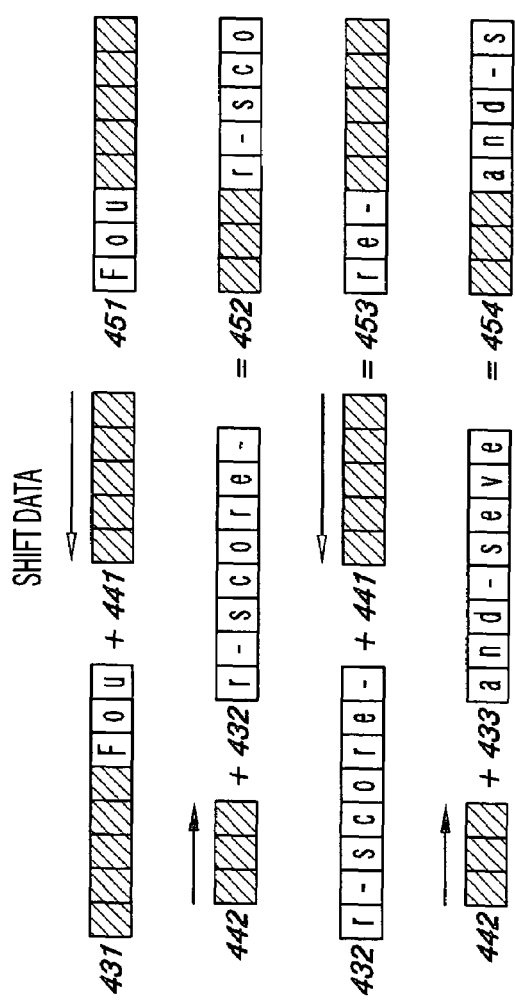
FIG. 4B illustrates shifting data according to embodiments of the present disclosure.

FIG. 4B illustrates shifting data according to embodiments of the present disclosure. In the embodiment shown in FIG. 4B, program instructions execute to shift portions of units of unaligned data to form aligned portions, as an operation in a method of copying unaligned data. Program instructions execute to shift data from the first temporary data register 431 toward a natural boundary by a shift amount 441 and into a first shift data register 451. Program instructions execute to shift data from the first temporary data register 431 away from the natural boundary by a shift complement amount 442 and into a second shift data register 452. Program instructions execute to shift data from the second temporary data register 432 toward the natural boundary by the shift amount 441 and into a third shift data register 453. Program instructions execute to shift data from the second temporary data register 433 away from the natural boundary by the shift complement amount 442 and into a fourth shift data register 454.

In this embodiment, program instructions can execute to determine the shift amount 441 by calculating the distance between the beginning of the string of unaligned data 420 and the beginning of the first temporary data register 431, at the time that data from the remainder 420-1 is loaded. In FIG. 4A, there are five bytes between the beginning of the string of unaligned data 420 and the beginning of the remainder data register 431, at the time that the remainder data 420-1 is loaded. Thus, in this embodiment, the shift amount 441 is five bytes.

In this embodiment, program instructions can execute to determine the shift complement amount 442 by calculating the difference between the size of the units of the data registers 431, 432, and 433, and the size of the shift amount 441. In FIG. 4A, the size of the units of the data registers 431, 432, and 433, is eight bytes and the size of the shift amount 441 is five bytes. Thus, in this embodiment, the shift complement amount 442 is the difference between eight bytes and five bytes, or three bytes. In this embodiment, program instructions can also execute to determine the shift complement amount 442 by calculating the size of the remainder 420-1, which is also three bytes. Given either the shift amount or the shift complement amount, the other can be derived by subtracting the known quantity from the total unit size.

In this embodiment, the natural boundary is at the left end of the remainder data register 431. However, in various embodiments, a natural boundary may be at the right end of the remainder data register 431, or at the left or right end of another data register, or at the left or right end of a memory bank, or in some other location within a memory.

FIG. 4C illustrates merging data according to embodiments of the present disclosure. In the embodiment shown in FIG. 4C, program instructions execute to merge aligned portions into units of aligned data, as an operation in a method of copying unaligned data. Program instructions execute to merge data from the first shift data register 451 with data from the second shift data register 452 to form a unit of aligned data in a first merge data register 461. Program instructions execute to merge data from the third shift data register 453 with data from the fourth shift data register 454 to form a unit of aligned data in a second merge data register 462.

FIG. 4D illustrates storing data according to embodiments of the present disclosure. In the embodiment shown in FIG. 4D, program instructions execute to store units of aligned data to form a string of aligned data, as an operation in a method of copying unaligned data. Program instructions execute to store data from the first merge data register 461 into a first store data register 470-1. Program instructions execute to store data from the second merge data register 462 into a second store data register 470-2. Data from the first store data register 470-1 and data from the second store data register 470-2 form the beginning of a string of aligned data 470. Unit of unaligned data 470-N represents the end of the string of unaligned data 470, still to be formed.

FIGS. 5A-5B are charts illustrating embodiments of a method of the present disclosure. FIG. 5A is a chart illustrating pipelined operations in pipelined execution units according to embodiments of the present disclosure. The chart of FIG. 5A shows pipelined operations, in a method of copying unaligned data, being performed in parallel by a pipelined computing device. The rows marked as 1, 2, 3, and 4 represent pipelined execution units of the pipelined computing device. The columns marked as 1, 2, 3, 4, 5, 6, 7, and 8 represent processor cycles of the pipelined computing device. In this embodiment, the contents of each filled cell in the chart represent a pipelined operation performed on data as program instructions are executed by a particular pipelined execution unit during a particular processor cycle. In filled cells, each letter inside the parentheses represents particular data being processed by the pipelined operation indicated in that cell. As shown, an empty cell indicates that no operation was performed by the corresponding execution unit during the corresponding processor cycle.

In the embodiment shown in FIG. 5A, a pipelined processor of the pipelined computing device is executing a loop of pipelined program instructions for performing the pipelined operations of loading, shifting, merging, and storing data. In this embodiment, LOAD represents the performance of a pipelined operation, by executing pipelined program instructions to load unaligned data from a string of unaligned data to form units of unaligned data, as described in FIG. 4A. SHIFT, in this embodiment, represents the performance of a pipelined operation, by executing pipelined program instructions, as described in FIG. 4B, to shift or position portions of the units of unaligned data to form aligned portions of data. According to this embodiment, MERGE represents the performance of a pipelined operation, as described in FIG. 4C, by executing pipelined program instructions to merge the aligned portions of data into units of aligned data. In this embodiment, STORE represents the performance of a pipelined operation, as described in FIG. 4D, by executing pipelined program instructions to store the units of aligned data to form a string of aligned data.

In the embodiment shown in FIG. 5A, pipelined program instructions execute to perform the pipelined loading, shifting, merging, and storing operations in sequence for data being processed together. For example, program instructions execute to: load data A in processor cycle 1, shift data A in processor cycle 2, merge data A in processor cycle 3, and store data A in processor cycle 4. However, in this method, pipelined program instructions also execute to perform the loading, shifting, merging, and storing operations in parallel for data not being processed together. For example, program instructions execute to: store data A in processor cycle 4, merge data B in processor cycle 4, shift data C in processor cycle 4, and load data D in processor cycle 4. In processor cycle 8, all data that has been loaded, has been shifted, merged, and stored, so no data is being processed and no operation is being performed. Pipelined computing devices can contain two, four, six, twelve or some other number of pipelined execution units, which can execute program instructions to process various amounts of data.

FIG. 5B is a chart illustrating states of pipelined operations according to embodiments of the present disclosure. The chart of FIG. 5A shows pipelined operations, in a method of copying unaligned data, being performed in parallel by a pipelined computing device. The rows marked as load, shift, merge, and store each represent a pipelined operation of the loop of pipelined program instructions of FIG. 5A. The columns marked as 1, 2, 3, 4, 5, 6, 7, and 8 represent processor cycles of the pipelined computing device of FIG. 5A. In this embodiment, the contents of each cell in the chart represent whether or not a particular pipelined operation is being performed by executing pipelined program instructions in the loop.

In this embodiment, a cell with a T represents a true state for the corresponding pipelined operation, during the corresponding processor cycle. In this embodiment, a true state indicates that program instructions of the loop are executing to process data to perform the corresponding pipelined operation. In this embodiment, a cell with an F represents a false state for the corresponding pipelined operation, during the corresponding processor cycle. In this embodiment, a false state indicates that program instructions of the loop are not executing to process data to perform the corresponding pipelined operation during the corresponding processor cycle.

Program instructions can be pipelined to incorporate true and false states for performing the pipelined operations of loading, shifting, merging, and storing data. In one embodiment, a set of tasks can be pipelined, to perform each of the pipelined operations of loading, shifting, merging, and storing data. For example, two pipelined loading tasks may comprise a set of pipelined loading tasks, which performs the pipelined operation of loading data. In this embodiment, when the two pipelined loading tasks have been completed then the set of pipelined loading tasks is considered true. In such an embodiment, when all of the tasks in a set of tasks have been completed, the set is considered true and the operation with which the set corresponds is also considered true. In this example, when the set of pipelined loading tasks is considered true then the loading operation is also considered true.

True and false states for pipelined operations can be incorporated into the execution of a loop of pipelined program instructions. In one embodiment, program instructions of a loop can be pipelined so that true and false states of pipelined operations determine the sequence of performance of pipelined operations. For example, program instructions can be pipelined so that a shift operation will not perform on certain data until a load operation for that certain data is true. In another embodiment, program instructions of a loop can be pipelined so that true and false states of pipelined operations determine how long a loop will be performed. For example, program instructions can execute so that the loop will stop being executed once the pipelined operations of loading, shifting, merging, and storing data are all false. In this embodiment, the loop will stop being executed at processor cycle 8, because at this cycle, all of the pipelined operations are false.

In one embodiment of the present disclosure, a pipelined computing device can perform a method of copying unaligned data, by executing the following pipelined program instructions:

```
dword_loop_ua:
  (p[2]) st8      [tgt0] = md1, 16
  (p[1]) shl      sd1 = remainder, shift_amt
  (p[1]) shr.u    sd2 = t1, shift_compl_amt
  (p[2]) st8      [tgt1] = md2, 16
  (p[1]) shl      sd3 = t1, shift_amt
  (p[1]) shr.u    sd4 = t2, shift_comp_amt
  ;;
  (p[1]) or       md1 = sd1, sd2
  (p[1]) or       md2 = sd3, sd4
  (p[1]) mov      remainder = t2
  (p[0]) ld8      t1 = [src0], 16
  (p[0]) ld8      t2 = [src1], 16
     br.ctop.sptk        dword_loop_ua
  ;;
```

In another embodiment of the present disclosure, a pipelined computing device can perform a method of copying unaligned data, by executing the following pipelined program instructions:

```
.rotr loadv[4], storev[4]
.rotp p[4]
dword_loop_ua:
  (p[2]) or       storev[0] = t3, loadv[1]
  (p[2]) or       storev[2] = loadv[2], loadv[3]
  (p[1]) shl      t3 = remainder, shift_amt
  (p[1]) mov      remainder = t2
  (p[1]) shr.u    loadv[0] = t1, shift_compl_amt
  (p[1]) shl      loadv[1] = t1, shift_amt
  (p[3]) st8      [tgt0] = storev[1], 16
  (p[3]) st8      [tgt1] = storev[3], 16
  (p[1]) shr.u    loadv[2] = t2, shift_comp_amt
  (p[0]) ld8      t1 = [src0], 16
  (p[0]) ld8      t2 = [src1], 16
     br.ctop.sptk        dword_loop_ua
```

Unless explicitly stated, the method embodiments described herein are not constrained to a particular order or sequence. Additionally, some of the described method embodiments or elements thereof can occur or be performed at the same point in time.

Although specific embodiments have been illustrated and described herein, those of ordinary skill in the art will appreciate that an arrangement calculated to achieve the same techniques can be substituted for the specific embodiments shown. This disclosure is intended to cover all adaptations or variations of various embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the various embodiments of the present disclosure includes other applications in which the above structures and methods are used. Therefore, the scope of various embodiments of the present disclosure should be determined with reference to the appended claims, along with the full range of equivalents to which such claims are entitled.

In the foregoing Detailed Description, various features are grouped together in a single embodiment for the purpose of streamlining the disclosure. This method of disclosure is not to be interpreted as reflecting an intention that the embodiments of the present disclosure require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method of copying unaligned data comprising:
performing a pipelined loop by overlapping execution of instructions in a repeated sequence of operations, wherein an iteration of the pipelined loop includes:
loading in a pipelined operation unaligned data from a string of unaligned data to form units of unaligned data, wherein loading includes:
loading into a first temporary data register, a remainder of unaligned data;
loading into a second temporary data register, a first unit of unaligned data from the string of unaligned data; and
loading into a third temporary data register, a second unit of unaligned data from the string of unaligned data;
shifting in a pipelined operation portions of the units of unaligned data to form aligned portions of data;
merging in a pipelined operation the aligned portions of data into units of aligned data;
storing in a pipelined operation the units of aligned data to form a string of aligned data; and
moving into the first temporary data register, data from the third temporary data register, to become the remainder on a next iteration of the pipelined loop; and
wherein the method includes executing one iteration of the pipelined loop in one processor cycle.

2. The method of claim 1, wherein the shifting includes:
shifting into a first shift data register, data from the first temporary data register, shifted by a shift amount;
shifting into a second shift data register, data from the second temporary data register, shifted by a shift complement amount.

3. The method of claim 2, wherein the shifting includes:
shifting into a third shift data register, data from the second temporary data register, shifted by the shift amount; and
shifting into a fourth shift data register, data from the third temporary data register, shifted by the shift complement amount.

4. The method of claim 1, wherein the merging includes merging into a first merge data register, data from a first shift data register merged with data from a second shift data register.

5. The method of claim 4, wherein the merging includes merging into a second merge data register, data from a third shift data register merged with data from a fourth shift data register.

6. The method of claim 1, wherein the storing includes storing into a first store data register, data from a first merge data register.

7. The method of claim 6, wherein the storing includes storing into a second store data register, data from a second merge data register.

8. A computer readable medium having instructions for causing a pipelined machine to perform a method comprising:
performing a pipelined loop by overlapping execution of instructions in a repeated sequence of operations, wherein an iteration of the pipelined loop includes:
loading in a pipelined operation unaligned data from an unaligned data item to form units of unaligned data, wherein loading includes:
loading into a first temporary data register, a remainder of unaligned data;
loading into a second temporary data register, a first unit of unaligned data from the unaligned data item; and
loading into a third temporary data register, a second unit of unaligned data from the unaligned data item;
positioning in a pipelined operation portions of the units of unaligned data to form aligned portions of data;
merging in a pipelined operation the aligned portions of data into units of aligned data;
storing in a pipelined operation the units of aligned data to form a string of aligned data; and
moving into the first temporary data register, data from the third temporary data register to become the remainder on a next iteration of the pipelined loop; and
wherein the method includes executing one iteration of the pipelined loop in one processor cycle.

9. The medium of claim 8, wherein the method includes:
performing the loading as a first set of pipelined tasks;
performing the positioning and the merging as a second set and a third set of pipelined tasks; and
performing the storing as a fourth set of pipelined tasks.

10. The medium of claim 8, wherein the method includes:
performing the loop wherein the positioning includes:
positioning into a first rotating position data register, data from the first temporary data register, positioned by a position amount;
positioning into a second rotating position data register, data from the second temporary data register, positioned by a position complement amount;
positioning into a third rotating position data register, data from the second temporary data register, positioned by the position amount; and
positioning into a fourth rotating position data register, data from the third temporary data register, positioned by the position complement amount; and
rotating the rotating position data registers each time the loop is performed.

11. The medium of claim 10, wherein the method includes:
performing the loop wherein the merging includes:
merging into a first rotating merge data register, data from the first rotating position data register merged with data from the second rotating position data register;
merging into a second rotating merge data register, data from the third rotating position data register merged with data from the fourth rotating position data register; and
rotating the rotating merge data registers each time the loop is performed.

12. The medium of claim 11, wherein the method includes performing the loop wherein the storing includes:
storing into memory pointed to by a first store data register, data from a first rotating merge data register; and
storing into memory pointed to by a second store data register, data from a second rotating merge data register.

13. A computer readable medium having instructions for causing a device to perform a method, comprising:
performing a pipelined loop by overlapping execution of instructions in a repeated sequence of operations, wherein an iteration of the pipelined loop includes:

loading as a first set of pipelined tasks unaligned data from an unaligned data item to form units of unaligned data, wherein loading includes:
    loading into a first temporary data register, a remainder of unaligned data;
    loading into a second temporary data register, a first unit of unaligned data from the unaligned data item; and
    loading into a third temporary data register, a second unit of unaligned data from the unaligned data item;
shifting as a second set of pipelined tasks portions of the units of unaligned data to form aligned portions of data;
merging as a third set of pipelined tasks the aligned portions of data into units of aligned data;
storing as a fourth set of pipelined tasks the units of aligned data to form a string of aligned data; and
moving into the first temporary data register, data from the third temporary data register to become the remainder on a next iteration of the pipelined loop; and
wherein the method includes executing one iteration of the pipelined loop in one processor cycle.

14. The medium of claim 13, wherein the method includes performing the loop until all of the sets of pipelined tasks are false.

15. The medium of claim 13, wherein the method includes: performing the loop wherein the shifting includes:
    shifting into a fourth temporary data register, data from the first temporary data register, shifted by a shift amount;
    shifting into a first rotating shift data register, data from the second temporary data register, shifted by a shift complement amount;
    shifting into a second rotating shift data register, data from the second temporary data register, shifted by a shift amount; and
    shifting into a third rotating shift data register, data from the third temporary data register; shifted by a shift complement amount; and rotating the rotating shift data registers each time the loop is performed.

16. The medium of claim 15, wherein the method includes: performing the loop wherein the merging includes:
    merging into a first rotating merge data register, data from the fourth temporary data register merged with data from the first rotating shift data register;
    merging into a second rotating merge data register, data from the second rotating shift data register merged with data from a third rotating shift data register; and
    rotating the rotating merge data registers and the rotating shift data registers each time the loop is performed.

17. The medium of claim 16, wherein the method includes: performing the loop wherein the storing includes:
    storing into memory pointed to by a first store data register, data from a first rotating merge data register; and
    storing into memory pointed to by a second store data register, data from a second rotating merge data register.

18. The medium of claim 13, the method including performing the loop in a sequence.

19. A computing device comprising:
a processor;
a memory, connected to the processor;
program instructions storable in the memory and executable by the processor to:
    perform a pipelined loop by overlapping execution of instructions in a repeated sequence of operations, wherein an iteration of the pipelined loop includes pipelined operations to:
        load unaligned data from a string of unaligned data to form units of unaligned data, including operations to:
            load a remainder of unaligned data into a first temporary data register;
            load a first unit of unaligned data from the unaligned data item into a second temporary data register; and
            load a second unit of unaligned data from the unaligned data item into a third temporary data register;
        shift portions of the units of unaligned data to form aligned portions of data;
        merge the aligned portions of data into units of aligned data;
        store the units of aligned data to farm a string of aligned data;
        move into the first temporary data register, data from the third temporary data register to become the remainder on a next iteration of the pipelined loop; and
        execute one iteration of the pipelined loop in one processor cycle.

20. The device of claim 19, including pipelined program instructions storable in the memory and executable by the processor to perform the pipelined operations in a loop.

21. The device of claim 20, including pipelined program instructions storable in the memory and executable by the processor to perform the loop until the entire string of unaligned data is loaded, shifted, merged, and stored.

* * * * *

UNITED STATES PATENT AND TRADEMARK OFFICE
CERTIFICATE OF CORRECTION

| | |
|---|---|
| PATENT NO. | : 7,434,040 B2 |
| APPLICATION NO. | : 11/188614 |
| DATED | : October 7, 2008 |
| INVENTOR(S) | : Jon F. Bayh |

It is certified that error appears in the above-identified patent and that said Letters Patent is hereby corrected as shown below:

In column 9, line 63, in Claim 8, after "method" insert -- , --.

In column 12, line 36, in Claim 19, delete "farm" and insert -- form --, therefor.

Signed and Sealed this

Twenty-eighth Day of July, 2009

JOHN DOLL
*Acting Director of the United States Patent and Trademark Office*